United States Patent [19]
Fornasiere et al.

[11] Patent Number: 5,848,947
[45] Date of Patent: Dec. 15, 1998

[54] SPLIT POWER TRANSFER MEMBER

[75] Inventors: Donald L. Fornasiere, Janesville; Michael G. Brosier, Beloit; Richard A. Reinke, Janesville, all of Wis.

[73] Assignee: Giddings & Lewis, Inc., Fond du Lac, Wis.

[21] Appl. No.: 697,450

[22] Filed: Aug. 23, 1996

[51] Int. Cl.$^6$ .............................. F16H 55/12; F16B 27/00
[52] U.S. Cl. .............................. 474/96; 474/95; 474/903; 403/2; 403/12; 403/344
[58] Field of Search ................................ 474/96, 95, 903; 464/30, 32, 182, 185; 403/2, 11, 12, 344

[56] References Cited

U.S. PATENT DOCUMENTS

| | | |
|---|---|---|
| 73,100 | 1/1868 | Hubbard . |
| 145,100 | 12/1873 | Gibbins . |
| 240,232 | 4/1881 | Church . |
| 297,985 | 5/1884 | Golden et al. . |
| 360,645 | 5/1887 | Baute .......................................... 474/96 |
| 412,916 | 10/1889 | Dodge .......................................... 474/96 |
| 1,189,925 | 7/1916 | Dexter . |
| 1,382,829 | 6/1921 | Gilbert . |
| 1,391,719 | 9/1921 | Conyngham ............................... 474/95 |
| 1,431,374 | 10/1922 | Cullman ...................................... 474/96 |
| 1,782,324 | 11/1930 | Tessky . |
| 2,382,740 | 8/1945 | Noffsinger ................................. 474/96 |
| 3,068,665 | 12/1962 | Firth . |
| 3,167,935 | 2/1965 | Fawick . |
| 3,385,080 | 5/1968 | Sorenson . |
| 3,554,589 | 1/1971 | Boggs . |
| 3,588,152 | 6/1971 | Shomo et al. . |
| 3,876,318 | 4/1975 | Crispell .................................... 403/290 |
| 3,917,424 | 11/1975 | Zugel . |
| 4,174,642 | 11/1979 | Martin et al. ........................... 74/243 R |
| 4,218,932 | 8/1980 | McComber .............................. 474/161 |
| 4,253,344 | 3/1981 | Kerklies ..................................... 474/96 |
| 4,525,094 | 6/1985 | Johnson et al. ........................... 403/11 |
| 4,754,906 | 7/1988 | Brovold ................................... 225/103 |
| 4,768,694 | 9/1988 | Fabris et al. .............................. 225/94 |
| 4,860,419 | 8/1989 | Hekman ............................. 29/156.5 A |
| 4,936,163 | 6/1990 | Hoag et al. ............................ 74/579 E |
| 4,970,783 | 11/1990 | Olaniran et al. ..................... 29/888.09 |
| 5,000,613 | 3/1991 | Heald et al. . |
| 5,037,356 | 8/1991 | Gladczak et al. ......................... 474/95 |
| 5,052,842 | 10/1991 | Janatka . |
| 5,062,734 | 11/1991 | Vanzee et al. . |
| 5,105,538 | 4/1992 | Hoag et al. .......................... 29/888.09 |
| 5,115,564 | 5/1992 | Miessen et al. ..................... 29/888.09 |
| 5,163,874 | 11/1992 | Engelstad . |
| 5,169,046 | 12/1992 | Miessen et al. ......................... 225/100 |
| 5,274,919 | 1/1994 | Becker ................................. 29/888.09 |
| 5,320,265 | 6/1994 | Becker ................................... 225/104 |
| 5,322,478 | 6/1994 | Bos et al. ................................. 474/95 |

FOREIGN PATENT DOCUMENTS

| | | |
|---|---|---|
| 0396797 | 5/1989 | European Pat. Off. . |
| 245241 | 1/1926 | Germany ................................. 474/96 |

*Primary Examiner*—Tamara L. Graysay
*Assistant Examiner*—Gary S. Hartmann
*Attorney, Agent, or Firm*—Foley & Lardner

[57] ABSTRACT

A pair of sprockets for use in a double chain and sprocket coupling for transmission of torque between shafts which are in approximate axial alignment with each other, and the abutting ends of which are closely spaced. Each of the sprockets is formed as one piece, and then cut into halves but for a web which is broken to separate the halve. The broken web serves to properly align and space the halves when placed over the end of a shaft to be coupled, and clamped thereon.

17 Claims, 3 Drawing Sheets

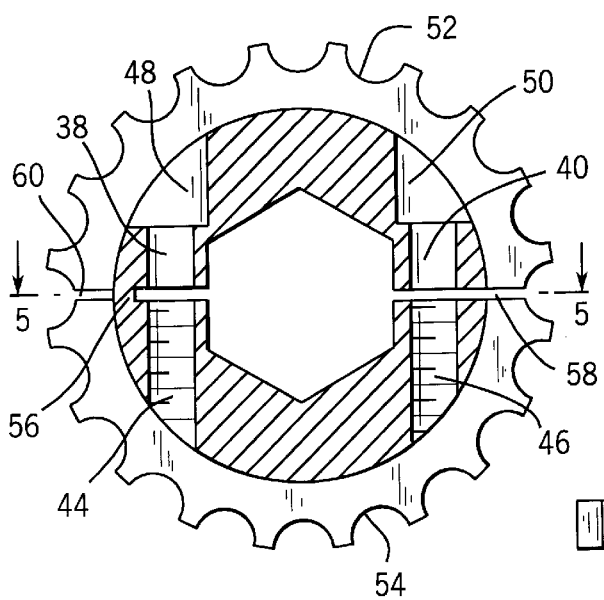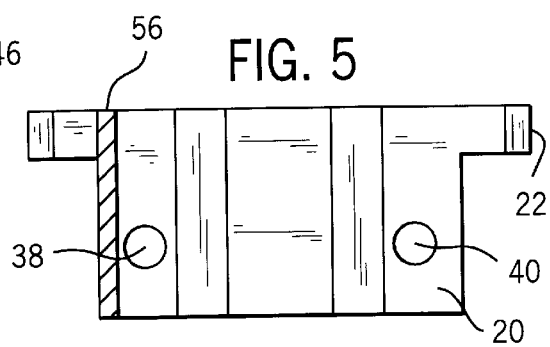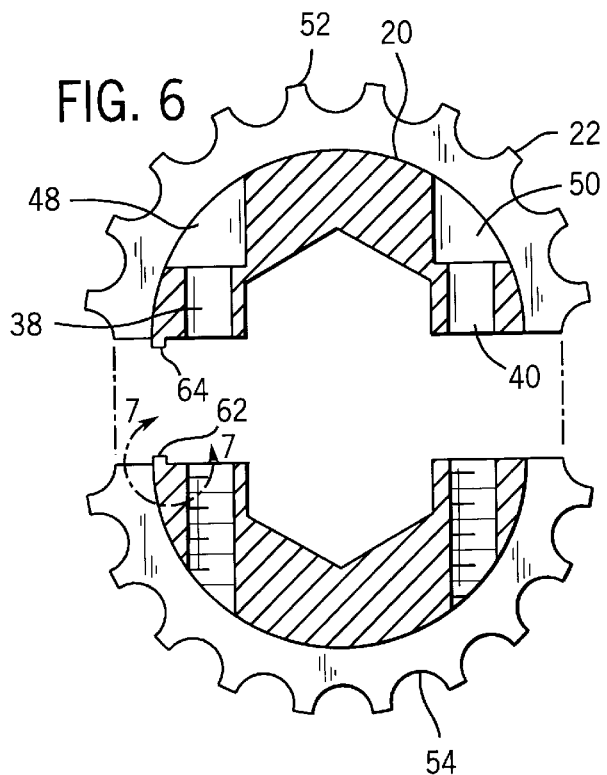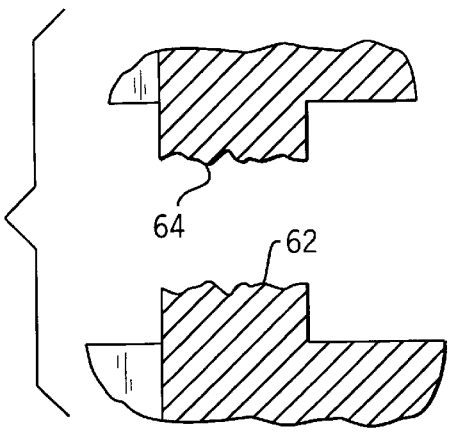

SPLIT POWER TRANSFER MEMBER

FIELD OF THE INVENTION

This invention relates to a double chain and sprocket coupling used to transmit torque between closely spaced ends of generally axially aligned shafts. Such couplings are used when it is desirable to accommodate some misalignment of the shafts, while providing direct coupling between the shafts. In certain applications the shafts may already be secured in place, with their ends closely spaced, such that there is insufficient space between the ends to move sprockets therebetween so as to place them on the ends of the shafts. In such applications, it would be desirable to utilize a power transfer member, such as a sprocket, which is split in two pieces, such that the pieces may be placed over the end of a shaft and then secured thereto.

BACKGROUND OF THE INVENTION

Double chain and sprocket couplings have long been used, as have split couplers and pulleys, as set forth in the following U.S. Pat. Nos.:

| U.S. Pat. No. | Inventor(s) |
|---|---|
| 1,189,925 | Dexter |
| 1,382,829 | Gilbert |
| 3,167,935 | Fawick |
| 3,554,589 | Boggs |
| 3,917,424 | Zugel |
| 5,163,874 | Engelstad |

Double chain and sprocket couplers, none of which are assembled with split sprockets, are set forth in the Dexter, Fawick and Engelstad patents. Split couplers, pulleys and collars are set forth in Gilbert, Boggs, Shomo and Zuegel patents. None of the latter patents reveal a construction in which the couplers, pulleys or collars are formed as integral members and then split in such a way as to provide for the proper alignment and spacing of the halves when secured on a shaft.

SUMMARY OF THE INVENTION

It is an object of this invention to provide split power transfer members such as sprockets or pulleys. In one embodiment of the invention, sprockets for a double chain and sprocket coupler are formed as integral members, and then separated into two halves which may be placed over the end of a shaft and clamped thereto. It is another object of this invention to provide a split sprocket, or other power transfer member, formed as one piece and then split to provide for proper alignment and spacing of the halves when secured on the end of a shaft. It is still another object of this invention to provide a method of forming a split power transfer member, e.g. a split sprocket made from an integrally formed sprocket which may then be secured on a shaft while maintaining the proper spacing between the teeth located on either side of the split.

In accordance with this invention, a double chain and sprocket coupling is provided in which the sprockets are split such that they can be placed over the adjacent ends of generally axially aligned shafts and clamped thereto, thus coupling the shafts together. Each of the sprockets has a toothed sprocket portion and a hub portion. The toothed sprocket and hub portions have a central opening which is sized and shaped to fit over the end of a shaft to be coupled.

Each sprocket is formed as a unitary structure and then separated into halves. When clamped over the end of a shaft, the halves will mate with each other so as to maintain the original spacing of the sprocket teeth. Preferably, the sprockets are split along a plane passing through a diameter of the sprocket so as to form two semicircular halves. Typically, the plane is centrally located between two teeth at each end of the diameter. The semicircular halves are formed by making slots or cuts of a finite thickness along the plane to form facing surfaces on the semicircular halves. The cuts are made along the diameter from each end of the diameter toward the center. One of the cuts extends completely through one side of the hub and partially through the other side of the hub. Another cut extends toward the center, but the ends of the cuts are spaced from each other such that a narrow axially extending web on one side of the opening connects the two halves. The web is then cracked or otherwise broken to form irregular mating surfaces on each of the semicircular halves.

A pair of apertures, oriented transverse to the plane, are formed in the hub portion of each of the semicircular halves. One aperture is located on each side of the central opening. In the preferred embodiment, one of the apertures is located between the web and the central opening.

A securing device is received in each of the pair of apertures to secure the semicircular halves to each other and to the end of the shaft received in the central opening. The sprocket is secured to the end of a shaft by placing the semicircular halves around the end of the shaft with the irregular mating surfaces aligned with each other. The securing device adjacent the web is tightened to draw the irregular mating surfaces into mating engagement. Thereafter the second securing device is tightened to secure the sprocket to the shaft. Secured in this way, the web maintains the spacing between the facing surfaces of the semicircular halves on opposite sides of the shaft at essentially the thickness of the cut. This maintains the desired spacing between the teeth located on each side of the split at each end of the cut. Thus, in accordance with this invention, one may readily couple the ends of shafts which are otherwise too close to each other to permit sprockets to pass therebetween.

BRIEF DESCRIPTION OF THE DRAWINGS

The invention will hereafter be described with reference to the accompanying drawings, wherein like referenced numerals denote like elements, and:

FIG. 4 is a cross-sectional view of one of the sprockets shown in FIG. 1 in a second stage of its manufacture;

FIG. 5 is a cross-sectional view taken along the line 5—5 of the sprocket shown in FIG. 4;

FIG. 6 is a cross-sectional view of one of the sprockets shown in FIG. 1 in a third stage of its manufacture;

FIG. 7 is an enlarged view of the cross-section indicated by the curved line 7—7 in FIG. 6;

DETAILED DESCRIPTION OF THE PREFERRED EMBODIMENT

Figures 1, 2, 3:
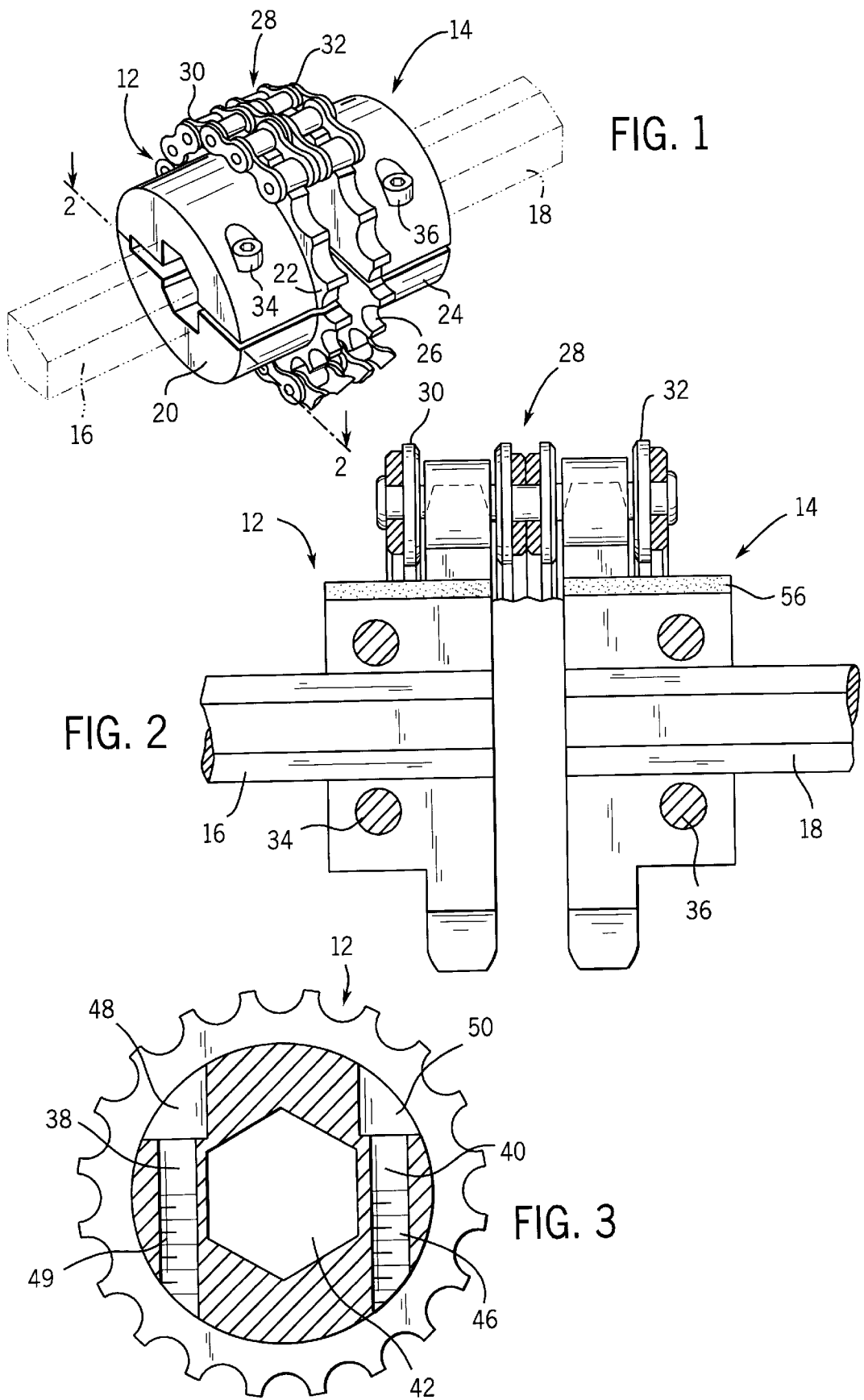
FIG. 1 is a perspective view of a pair of split sprockets constructed in accordance with this invention, assembled as a double roller chain and sprocket coupler.
FIG. 2 is a cross-sectional view of the double roller chain and sprocket coupler taken generally along the line 2—2 in FIG. 1.
FIG. 3 is a cross-sectional view of one of the sprockets shown in FIG. 1 in a first stage of its manufacture.

Referring to FIGS. 1 and 2, a pair of split power transfer members 12 and 14, constructed in accordance with a preferred embodiment of this invention, are shown secured to the adjacent ends of hexagonal shafts 16 and 18. Power transfer members could be pulleys, sprockets or other power transfer type devices. To facilitate description of the present invention, however, power transfer members 12 and 14 will be described as sprockets. The split sprocket 12 includes a collar or hub portion 20 and a radially extending flange, e.g., a toothed sprocket portion 22 as illustrated. Similarly, the split sprocket 14 includes a collar or hub portion 24 and a toothed sprocket portion 26. A double roller chain 28 includes roller chains 30 and 32. Chain 30 engages sprocket 22 and chain 32 engages sprocket 26. As will be hereinafter described, the split sprocket 12 preferably is secured to the hexagonal shaft 16 by a pair of cap screws, one of which 34 is shown. Similarly, split sprocket 14 is secured to hexagonal shaft 18 by a pair of cap screws, one of which 36 is shown.

Referring to FIG. 3, a sprocket such as 12 or 14 is shown in cross-section prior to being split to form a split coupling in accordance with this invention. Each of the sprockets 12 and 14 are first manufactured as a unitary structure. The unitary structure is provided with a pair of parallel holes 38 and 40 on each side of a bore or opening, such as opening 42. Portions 44 and 46 of holes 38 and 40, respectively, are threaded. Larger holes or countersinks 48 and 50 can be provided at the non-threaded ends of holes 38 and 40, respectively, for receiving the heads of the cap screws.

As illustrated in FIG. 4, the sprocket is essentially cut into two halves 52 and 54 except for a narrow axially extending web portion 56. Preferably, an axially extending slot or cut 58 is made from right to left along a diameter of the sprocket up to the right edge of the web 56. A second slot or cut 60 is made from the left toward the right along the same diameter of the sprocket through the sprocket portion 22 up to the outer diameter of the collar portion 20. The slots 58 and 60, which preferably are of the same width, may be made by sawing, electronic discharge machining, or any other suitable method.

After the slots have been made to form the narrow web portion 56, a force is applied at the right end of the cut 58 as shown in FIG. 4 to break the web 56 and to separate the two halves 52 and 54 as shown in FIG. 6. By breaking the halves 52 and 54 apart, irregular, but matching surfaces are provided on the broken faces of the web portion 56 as shown at 62 and 64 in FIG. 7. With the formation of the two halves 52 and 54, the split sprocket is completed and is ready for mounting on the end of a shaft.

Figure 8:
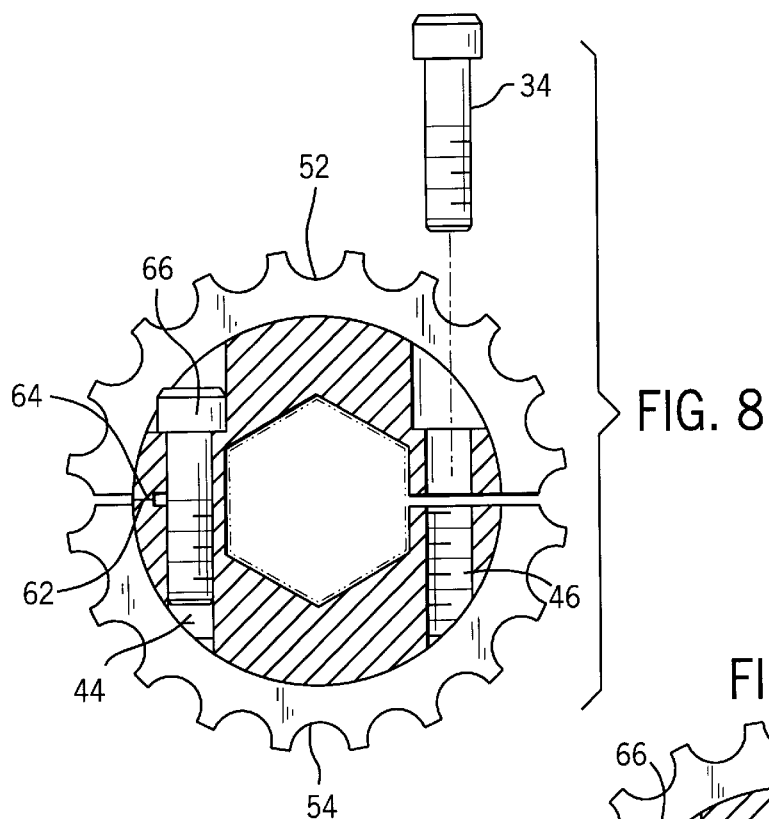
FIG. 8 is a cross-sectional view of one of the sprockets shown in FIGS. 1, 2, and 6 in the first stage being secured to the end of a hexagonal shaft.
Figure 9:
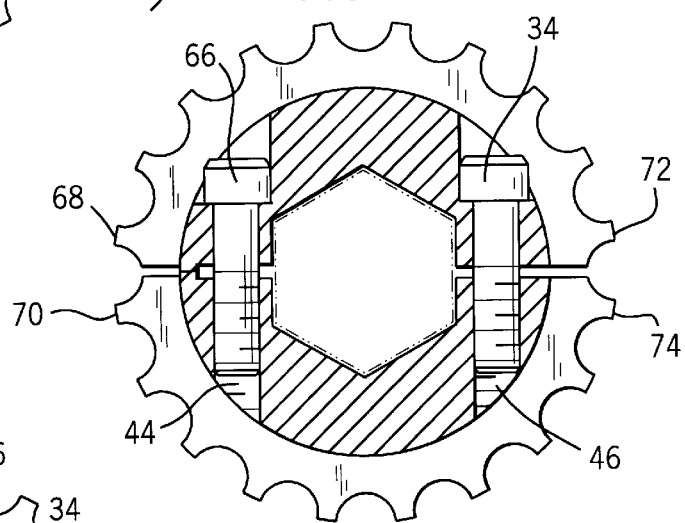
FIG. 9 is a cross-sectional view of the sprocket shown in FIG. 8, fully secured to a hexagonal shaft.

Referring to FIG. 8, the two halves 52 and 54 of a sprocket are placed around a hexagonal shaft such as 16, and the irregular but matching surfaces 62 and 64 are aligned in a mating configuration. A cap screw 66 is inserted in half 52 and threaded into the threads 44 provided in half 54 to bring the two matching surfaces 62 and 64 into engagement with each other. Thereafter, the second cap screw 34 is placed in the hole in sprocket half 52 and secured in the threads 46 in sprocket half 54. Wherein the cap screw 66 has already been tightened, the tightening of cap screw 34 will not pull the halves together so as to bring the cut edges closer together than the width of the cut. When the sprocket halves are fully secured on the hexagonal shaft 16, the original spacing between the teeth 68 and 70, on the left, as shown in FIG. 9, and the original spacing between the teeth 72 and 74 on the right, as shown in FIG. 9, are maintained.

Thus, when using a split sprocket formed in accordance with this invention, it is possible, for example, to install a double chain and sprocket coupling between two shafts when the ends are so closely spaced that it would be otherwise difficult or impossible to insert sprockets between them. The sprocket halves can simply be placed over each shaft end and tightened together. Further, by forming a split coupling in accordance with this invention, the spacing between the teeth on each side of the split is maintained at its original distance. Additionally, the teeth are also aligned axially along the shaft. This is due to the irregular but matching surfaces of broken faces 62 and 64 along the axial direction.

Figure 10:
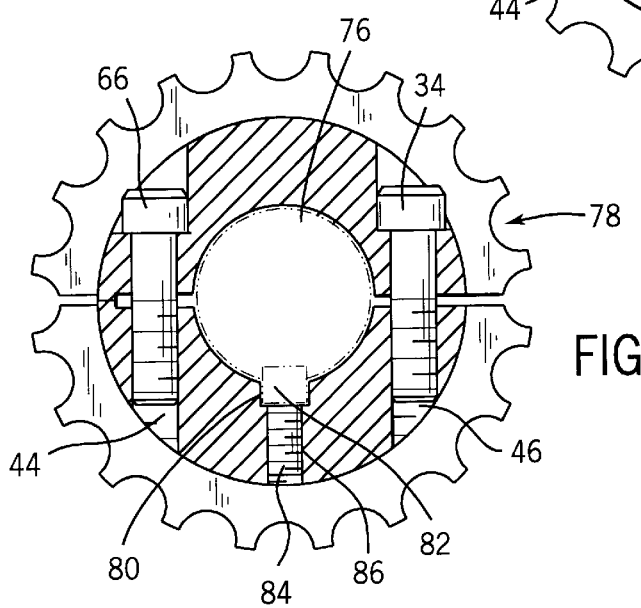
FIG. 10 is a cross-sectional view of an alternate embodiment of the split sprocket of this invention intended for use on a cylindrical shaft.

A split sprocket for a double chain coupling in accordance with this invention may be utilized with shafts of various shapes, such as the round shaft 76 shown in FIG. 10. To assure that the assembled sprocket 78 will rotate with the round shaft 76, a keyway 80 may be provided in the shaft 76 and in one half of the sprocket 78 to receive a key 82. Key 82 is held in place by a set screw 84 received in a threaded hole 86 in the sprocket.

While one embodiment, and a variation thereof have been shown, it should be apparent to those skilled in the art that what has been described is considered at present to be a preferred embodiment of the split sprocket for a double chain coupling of this invention. Various changes may be made in the split sprocket for a double chain coupling without actually departing from the true spirit and scope of this invention.

What is claimed is:

1. A sprocket for use in a chain coupling, comprising:
   a hub having an opening designed to receive a shaft;
   a toothed portion extending outwardly from the hub, the combined hub and toothed portion having been fractured into a first component and a second component thereby creating a first fractured surface of said first component and a second fractured surface of said second component, the first and second fractured surfaces being located on a web portion that terminates a slot disposed between the first and second components, the first and second fractured surfaces having irregular and matching faces adapted for mating engagement; and
   a securing device cooperating with the first component and the second component to hold the first fractured surface and the second fractured surface in mating engagement.

2. The sprocket as recited in claim 1, wherein the slot lies along a plane passing through a diameter of the hub.

3. The sprocket as recited in claim 2, wherein the toothed portion includes a plurality of teeth separated by a plurality of valleys, the plane passing through a base of a valley.

4. The sprocket as recited in claim 1, wherein the hub opening is circular in cross-section.

5. The sprocket as recited in claim 1, wherein the hub opening is hexagonal in cross-section.

6. The sprocket as recited in claim 1, wherein the slot extends inwardly toward the web portion from two different locations.

7. The sprocket as recited in claim 1, wherein the web portion is narrow relative to the length of the slot.

8. The sprocket as recited in claim 7, wherein the narrow web portion is disposed along the length of the slot on only one side of said opening.

9. A sprocket coupling adapted for use with a double roller chain for transmission of torque between shafts which are in approximate axial alignment with each other, and the abutting ends of which shafts are closely spaced, the sprocket coupling comprising:

a pair of sprockets wherein each of said sprockets has a toothed sprocket portion, and an axially adjoining hub portion, said toothed sprocket and hub portions having an opening which is sized and shaped to fit over a shaft to be coupled, each of said sprockets being split along a plane passing through a diameter of said sprocket in order to form two semicircular halves, said plane passing through the base of a valley between two teeth at each end of said diameter, each of said semicircular halves being formed by a cut of a finite thickness in said sprocket in said plane in order to form facing surfaces on said semicircular halves, except for a narrow axially extending web on one side of said opening, said web being fractured to form irregular mating surfaces on each of said semicircular halves;

said sprockets including at least a pair of apertures extending perpendicular to said plane being formed in said hub portion of each of said semicircular halves, at least one aperture on each side of said opening, at least one of said apertures being located between said web and said opening, and a securing device received in each of said pair of apertures in each of said semicircular halves for securing said semicircular halves to each other and to a shaft received in said opening;

whereby said semicircular halves may be placed around the the shaft, said irregular surfaces aligned with each other, said securing device adjacent said web tightened to draw said irregular mating surfaces into mating engagement, and thereafter said securing device not adjacent said web tightened to secure said sprocket to the shaft, said facing surfaces of said semicircular halves on opposite sides of the shaft being equally spaced by said finite thickness of said cut, in order to maintain the original spacing between said teeth located on each side of said plane at each end of said cut.

10. A power transfer member that can be attached to a shaft, comprising:

a hub having an opening designed to receive a shaft;

a flange extending outwardly from the hub, the combined hub and flange having been fractured into a first component and a second component thereby creating a first fractured surface of said first component and a second fractured surface of said second component, the first and second fractured surfaces being located on a web portion that terminates a slot disposed between the first and second components, the first and second fractured surfaces having irregular and matching faces adapted for mating engagement; and a securing device cooperating with the first component and the second component to hold the first fractured surface and the second fractured surface in mating engagement.

11. The power transfer member as recited in claim 10, wherein the slot lies along a plane passing through a diameter of the hub.

12. The power transfer member as recited in claim 11, wherein the flange includes a plurality of teeth separated by a plurality of valleys, the plane passing through a base of a valley.

13. The power transfer member as recited in claim 10, wherein the hub opening is circular in cross-section.

14. The power transfer member as recited in claim 10, wherein the hub opening is hexagonal in cross-section.

15. The power transfer member as recited in claim 10, wherein the slot extends inwardly toward the web portion from two different locations.

16. The power transfer member as recited in claim 10, wherein the web portion is narrow relative to the length of the slot.

17. The power transfer member as recited in claim 16, wherein the narrow web portion is disposed along the length of the slot on only one side of said opening.

* * * * *